June 27, 1961
N. E. PETERSON
2,990,444
DATA COUNTER
Filed Dec. 12, 1957
2 Sheets-Sheet 1
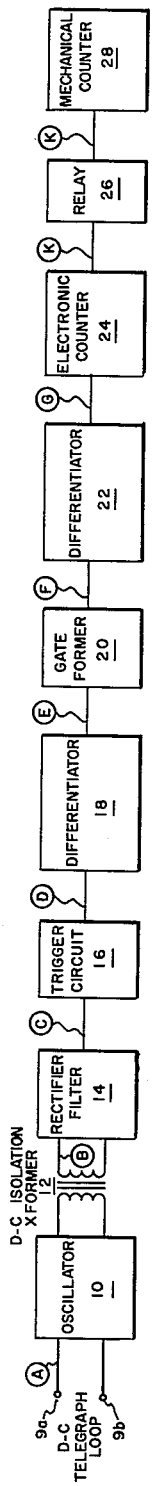
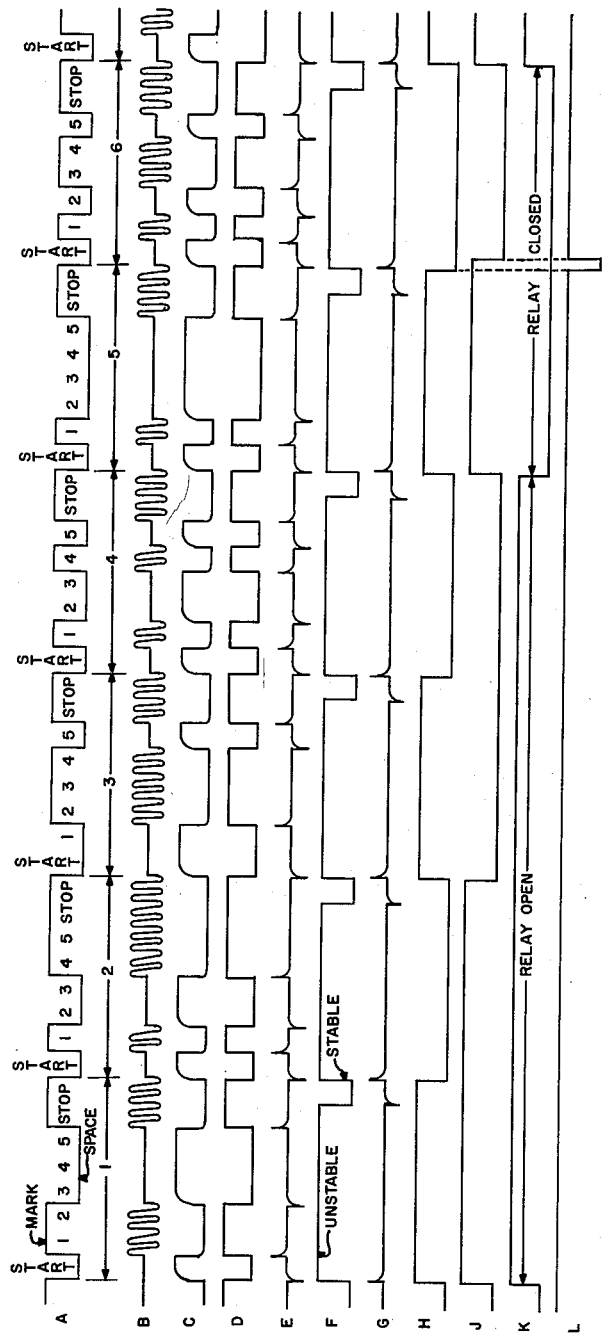
INVENTOR.
NORMAN E. PETERSON
BY
*S.C. Yutee*
ATTORNEY.

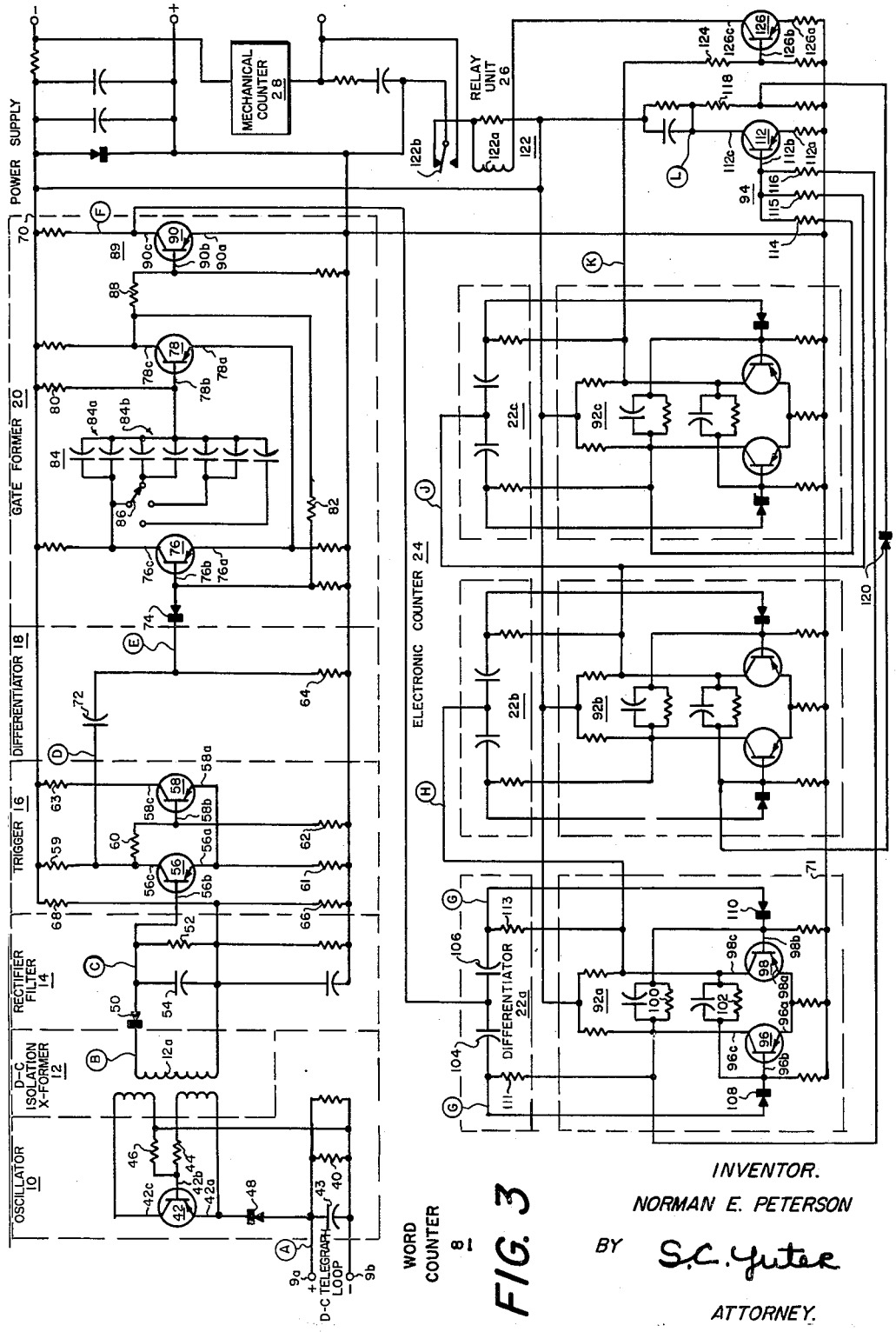

United States Patent Office 2,990,444
Patented June 27, 1961

2,990,444
DATA COUNTER
Norman Everett Peterson, Stamford, Conn., assignor to Stelma, Incorporated, Stamford, Conn., a corporation of Connecticut
Filed Dec. 12, 1957, Ser. No. 702,418
15 Claims. (Cl. 178—2)

This invention relates to communication systems in general and in particular to the measurement of the number of words or characters transmitted over a communications circuit such as telegraph and radio teletype circuits.

With the increasing number of communication circuits in use, and especially when communication terminals are linked by a multiple number of circuits over which a message may be sent, it is becoming more important to monitor the use made of each individual circuit. This information, when assembled and analyzed, can point out the need for increasing or decreasing the number of circuits linking the terminals thus improving the efficiency of a system both economically and with regard to the rapid transmission of messages. For example, in large and complicated telegraph systems, it is extremely important to be able to provide basic data for setting up message routes through the system to make optimum use of all telegraph circuits.

Heretofore, it has been standard practice to obtain a measure of the number of telegraph characters transmitted or received by one of two methods; by measuring the length of time a circuit is in use by means of a clock-work or by measuring the length of tape fed into or received from a telegraph circuit equipped to utilize tape. Both of these methods have defects causing them to be inaccurate and time consuming.

Therefore, the general object of this invention is to provide improved apparatus for indicating the amount of use of a communications circuit.

It is a specific object of this invention to provide an automatic counter which will display a number equal to the number of characters which have been transmitted or received in the communications circuit to which the counter is connected.

Another object of the invention is to provide an automatic counter containing apparatus for dividing the number of characters counted by some number "$n$" before displaying the result. Since the average English word is five letters in length and a space is required between words, "$n$" is generally chosen to be equal to six. The display then tells the number of "average" words which have been transmitted or received.

A further object of the invention is to provide an all electronic counter utilizing semi-conductor devices throughout.

Briefly, in accordance with a preferred embodiment of the invention, an information unit counter is provided for use in a communication system employing characters represented by combinations of marks and spaces with a start space at the beginning of each character and a stop mark at the end of the character. The counter includes a circuit having a rest condition and an activated condition. A mark to space transition at the beginning of the characters causes the circuit to change conditions. Means are included to return the circuit to its original condition during the occurrence of the next stop mark. Responsive to the circuit are counting means to establish a count number related to the number of changes of conditions.

Other objects, features and advantages of the invention will be more fully understood from the following description considered in connection with the accompanying illustrative drawings.

In the drawings, which illustrate the best mode presently contemplated for carrying out the invention:
FIGURE 1 is a block diagram of a word counter in accordance with the preferred embodiment of the invention;
FIGURE 2 shows the wave shapes of incoming pulses and pulses generated at various points in the word counter shown in FIGURE 1;
FIGURE 3 is a schematic diagram of a word counter in accordance with an embodiment of the present invention which makes use of semi-conductor devices throughout.

*General description (FIGS. 1 and 2)*

Referring to FIGURES 1 and 2, line A of FIGURE 2 shows the waveform on a telegraph circuit when the first six letters of the alphabet are being transmitted in the Baudot code. In Baudot code the intelligence of a single character is contained within the various combinations of a group of five pulses. Each group is preceded by a start impulse or open line interval to initiate the operation of the receiving equipment, and followed by a stop impulse or closed line interval to bring all apparatus to a stop in anticipation of the next character.. Each character therefore consists of a total of seven or more unit intervals which includes a start pulse of unit length, a selecting period five time units in length, and a stop pulse of one or more (including fractions thereof) time units. In general, any one of the five elements of the selecting period may be either marking (closed line) or spacing (open line).

The telegraph signal is applied to the word counter 8 via input terminals 9a and 9b of the oscillator 10 as shown in FIGURE 1, causing it to oscillate on marks and not oscillate on spaces as shown on line B of FIGURE 2. The frequency of the oscillator 10 is adjusted to be about 20 kilocycles per second in order to minimize distortion of the telegraph signal. The alternating signal produced by the oscillator 10 is coupled by means of D.C. isolation transformer 12 to the rectifier-filter 14 which restores the telegraph signal to direct current, as shown in line C of FIGURE 2. The purpose of the oscillator 10 and D.C. isolation transformer 12 is to provide direct current isolation between the telegraph circuit and the rest of the circuitry of the word counter 8. The filtering introduced by the rectifier-filter 14 is sufficiently heavy to shape the telegraph signal as shown in line C of FIGURE 2. The purpose of this is to prevent holes, spikes and other forms of transient interference from reaching the word counter circuitry where it might cause erratic operation of the device.

The output of the rectifier-filter 14 is applied as an input to the trigger circuit 16. The trigger circuit 16 reshapes the telegraph signal and inverts its polarity as shown in line D of FIGURE 2. The reshaped telegraph signal is differentiated by the differentiator 18 to produce the train of impulses shown in line E of FIGURE 2. Each of these impulses occurs when the input telegraph signal goes through a transition from mark-to-space or space-to-mark. The differentiated signal is fed to the gate former 20.

The gate former 20 is a monostable multivibrator. That is, it is a circuit having two possible states or conditions of voltage and current, only one of which is stable. Thus, the circuit in the absence of external stimulation will be in its stable state. When a pulse is applied to its input, the monostable multivibrator immediately triggers to its unstable condition. The length of time during which it will persist in this unstable condition is determined almost entirely by its own parameters. Thus, when the circuit is in its stable condition, it will respond to an input impulse and trigger to its unstable condition for a period fixed by its own parameters and during this time will not respond to further input impulses. Upon returning to its stable state the circuit is again conditioned to respond to the next input impulse.

The monostable multivibrator will, when its parameters are properly adjusted, respond to the impulses shown in line E of FIGURE 2 to produce the waveform shown in line F of FIGURE 2. That is, the first impulse appearing on its input (which in this case is caused by the mark-to-space transition of the input telegraph signal at the beginning of the start pulse of character number one) will trigger it to its unstable state. The monostable multivibrator is adjusted so that the circuit will return from its unstable to stable state during the stop pulse as shown in line F of FIGURE 2. The circuit will then be conditioned to respond to the impulse generated by the mark-to-space transition of the input telegraph signal at the beginning of the start pulse for character number two. In this fashion, the monostable multivibrator acts as a gate former producing one gate pulse for each telegraph character applied to the input of the word counter.

The gate pulses thus formed could be used to activate a counting device, such as an electro-mechanical counter, directly. The resulting number on the counter would then be equal to the number of characters transmitted in the telegraph circuit. However, it is preferable to divide the number of characters by six before displaying it in order that the number of average length words transmitted will be shown instead of the number of characters.

To accomplish this division by six, the gate pulses are differentiated by the differentiator 22 and fed to the electronic counter 24 which has a scale of six. The electronic counter 24, whose operation will be more fully described later, consists of three bistable multi-vibrators. That is, three circuits whose parameters and interconnections are so arranged that two stable states of current and voltage exist. An input circuit is provided for each circuit to allow external impulses to trigger the circuits from one stable state to the other. In the absence of input impulses the circuits remain in whichever state they are in. The gate pulses produced by the gate former 20 (line F of FIGURE 2) are differentiated by the differentiator 22 to produce impulses as shown in line G of FIGURE 2. When these impulses are applied as triggers to the first bistable multivibrator, the third bistable multivibrator will complete one cycle of operation for each six gates. The waveform for the third bistable multivibrator is shown in line K of FIGURE 2. This signal is used to control the opening and closing of relay 26 as indicated in line K of FIGURE 2. Contacts on the relay unit 26 control the flow of electric current in the solenoid of an electro-mechanical counter 28. The mechanical counter 28 then advances one count for each six characters of the telegraph signal in the telegraph loop.

*Detailed description (FIGS. 2 and 3)*

FIGURE 3 shows a schematic diagram of the word counter 8. Although p-n-p germanium alloy junction transistors are implied, both p-n-p and n-p-n varieties of both germanium and silicon transistors may be used by choosing suitable circuit parameters and biasing potentials.

The telegraph signals as shown on line A of FIGURE 2 are applied to the input terminals 9a and 9b of the word counter 8. Whenever the telegraph loop is transmitting a mark, electric current will flow through resistor 40 producing a voltage drop. This voltage is applied to the oscillator 10, a transistor feed-back oscillator which includes the transistor 42, the resistor 44, the resistor 46 and the direct current isolation transformer 12. The oscillator 10 breaks into oscillation each time a potential is applied to it from resistor 40, thus producing the waveform on line B of FIGURE 2. In the event that the potential across resistor 40 should accidentally be reversed from the indicated polarity, the diode 48 blocks this reverse potential and prevents possible damage to transistor 42. Capacitor 43 helps to reduce interference from spikes, holes and other forms of interference which may be present on the telegraph signal.

Each time there is a burst of oscillations, a voltage is induced in winding 12a of the direct current isolation transformer 12. The alternating voltage received by the rectifier-filter 14 is rectified by the diode 50 and filtered by resistor 52 and capacitor 54 to restore the telegraph signals to their original form as shown on line C of FIGURE 2.

The trigger circuit 16, which comprises the transistors 56 and 58 together with resistors 59—63, is a regenerative trigger circuit having only two states of current and voltage. The state it is in at any time is determined by the state of its input voltage relative to a threshold voltage. When the input voltage at the base 56b of the transistor 56 is higher than the threshold voltage, transistor 58 will be fully conducting and transistor 56 completely cut off. When the input voltage is below the threshold voltage, transistor 58 will be completely cut off and transistor 56 fully conducting.

In particular, quiescently, the potential at the base 56b will be determined by the voltage divider action of resistors 66 and 68 which are chosen so that the transistor 56 is initially not conducting. Current will then flow from the negative supply voltage 70 through resistors 59 and 60 to the base 58b of the transistor 58 where it divides, part going into the transistor 58 and part being shunted to ground by resistor 62. The current supplied to the base 58b is sufficient to maintain it in a state of collector saturation. Current flows from the negative supply 70 via resistor 63, collector 58c, emitter 58a and resistor 61 to ground. Since the emitters 56a and 58a are coupled together, the current through transistor 58 sets the emitter potential of transistor 56 at a given potential. Thus, by selecting the resistors 66 and 68, a base potential is developed which initially causes transistor 56 to be nonconducting. The circuit will remain in this state until the oscillator 10 breaks into oscillation to produce a direct current voltage across resistor 52 which reduces the potential at the base 56b sufficiently below the emitter potential to cause conduction of the transistor 56. When the transistor 56 conducts, the current which was flowing through resistor 59 to the base 58b is shunted to the collector 56c of transistor 56 thereby cutting off the flow of collector current in transistor 58. Thus the states of the two transistors 56 and 58 have been reversed and will remain so until the oscillator 10 stops and there is no longer a voltage drop across resistor 52.

When the input telegraph signal is on mark, transistor 56 is conducting, and when the input telegraph signal is on space, transistor 58 is conducting. At the collector 56c, therefore, the waveform shown on line D of FIGURE 2 is produced. The signal representation of this waveform is differentiated by the differentiator 18 comprising the capacitor 72 and the resistor 64 to produce the series of pulses shown on line E of FIGURE 2. The negative pulses are applied via diode 74 to the base 76b of the transistor 76 which together with the transistor 78 form a monostable multivibrator which with the inverter amplifier 89 is a preferred embodiment of the gate former 20. The diode 74 is polarized to prevent positive pulses from affecting the monostable multivibrator.

The transistors 76 and 78 operate as a monostable multivibrator as follows: In the absence of trigger pulses, transistor 78 will be conducting in a state of saturation by returning its base 78b to the negative voltage bus 70 via resistor 80 to supply base current to the transistor 78. The base 76b is connected to the collector 78c via resistor 82. Since the transistor 78 is conducting, its collector 78c will be at a potential close to ground and no base current is available for the transistor 76 which is therefore in a nonconducting state. These conditions will continue until a negative current pulse is applied to the transistor 76 via the diode 74 which turns the transistor 76 on causing its collector 76c to rise from a negative potential almost to ground potential. This positive swing is coupled through several capacitors 84 to the base 78b turning the transistor 78 off causing its collector 78c to swing negative supplying current to the base 76b via resistor 82 to hold it on after the negative current pulse has disappeared. This condition is unstable. As soon as the monostable multivibrator triggers to its unstable condition, the coupling capacitors 84 start charging to a new potential level through resistor 80. After a period of time determined by the values of the capacitors 84 and resistor 80, the positive voltage holding transistor 78 cut-off will disappear and transistor 78 again conducts current. Its collector 78c returns to a potential close to ground and shunts off the supply of base current to transistor 76 through resistor 82.

Since the time duration of this pulse is determined by the product of the values of capacitors 84 and resistor 80, it is possible to adjust this duration to match the incoming signals by varying the time constants. Capacitors 84a and 84b in parallel form part of the required capacitance. Switch 86 connects in additional capacitance to trim the pulse duration for different signal transmission speeds.

The collector 78c is coupled through resistor 88 to the base 90b of transistor 90 which acts as an inverting amplifier reproducing the waveform shown in line F of FIGURE 2 which is fed to the electronic counter 24.

The electronic counter 24 comprises the cascaded bistable multivibrators 92a—92c, the differentiators 22a—22c, and the coincidence detector 94.

The individual action of typical bistable multivibrator 92a which includes the transistors 96 and 98 may be explained as follows. Assume transistor 96 is conducting in a saturated condition. Its collector 96c will be close to ground and no current will flow through resistor 100 to the base 98b of the transistor 98 which will therefore be nonconducting. Its collector 98c will be negative providing a flow of current through the resistor 102 to the base 96b to keep transistor 96 conducting. Thus, conditions are satisfied to maintain the assumed conditions. Had the original asumption been that the transistor 98 was conducting, the same reasoning as before would show that the transistor 96 was nonconducting causing transistor 98 to maintain its conducting state. Thus the transistors 96 and 98 form a circuit with two stable states with one of the two transistors conducting and the other nonconducting.

In order to trigger the bistable multivibrator 92a from one state to the other, a steering circuit composed of the diodes 108 and 110 and resistors 111 and 113 is supplied. The capacitors 104 and 106 in the differentiator 22 act as differentiating capacitors and when the signal at the collector 90c of the transistor 90 is applied to the common point of capacitors 104 and 106, the waveforms shown on line G of FIGURE 2 are produced at the anodes of the diodes 108 and 110. The diodes 108 and 110 prevent the negative pulses from disturbing the bistable multivibrator. Positive pulses, however, will cause the diodes 108 and 110 to conduct. In order to allow only one of the diodes 108 and 110 to conduct, resistors 111 and 113 are included. Assume that transistor 96 is conducting so that its collector 96c will be at approximately the same potential as its base 96b. This potential is coupled to the diode 108 through the resistor 111, hence a positive pulse at the anode of the diode 108 will cause this diode to conduct tending to shut off the current flow in the transistor 96. Since the transistor 98 is not conducting, its collector 98c will be at a negative potential with respect to its base 98b. This potential is coupled to diode 110 through resistor 113 establishing a reverse bias across diode 110 to prevent its conduction so that the pulse does not affect transistor 98.

From the symmetry of the circuit it should be noted that had the transistor 98 been conducting when the positive pulse was applied, diode 110 would have conducted to shut off the transistor 98. Thus, whenever a positive swing of potential is applied to the input of the differentiator 22, the bistable multivibrator 92 reverses its state. The conducting transistor becomes nonconducting and the nonconducting transistor becomes conducting.

Thus when the waveform in line F of FIGURE 2 is applied to the differentiator 22, the transistor 98 will alternately become conducting and nonconducting. The waveform of the collector 98c will be as shown in line H of FIGURE 2. The waveform of the signal from the collector 96c will be identical except that the polarities will be reversed.

The bistable multivibrator 92b is identical to the bistable multivibrator 92a. The signal transmitted to the differentiator 22b is from the collector 98c of the bistable multivibrator 92a. The bistable multivibrator 92b will reverse its state each time the transistor 98 turns on producing a positive going waveform. The waveform at the output of the bistable multivibrator 92b is shown on line J of FIGURE 2.

Similarly the bistable multivibrator 92c receives its trigger pulses via the differentiator 22c from the output of the bistable multivibrator 92b. The waveform of the output of the bistable multivibrator 22c will be as shown in line K of FIGURE 2.

The three bistable multivibrators 92 form a counter with a scale of eight since each bistable multivibrator completes one-half a cycle of operation for each full cycle of the preceding stage.

The coincidence circuit 94 formed by the transistor 112 and the resistors 114—116 is included to reduce the counting scale from eight to six since a scale of six counter is desired. The three resistors 114—116 are connected to the collector 96c of the bistable multivibrator 92a and to appropriate points of the multivibrators 92b and 92c respectively. Whenever any one or more of the associated transistors is nonconducting, its collectors will be negative and current will be supplied through the appropriate resistor to the base 112b of the transistor 112 keeping it in a conducting state. However, when all three associated transistors are conducting simultaneously, no current is supplied through resistors 114—116 to the base 112b and transistor 112 will be in a nonconducting state.

The operation of the three bistable multivibrators 92 as a scale of six counter will be described. Assume that just previous to pulse number one in line G of FIGURE 2 the transistors 96 of all bistable multivibrators 92 are conducting. Pulse one will cause transistor 96 of bistable multivibrator 92a to become nonconducting and transistor 98 of bistable multivibrator 92a to become conducting. This action transmits a positive pulse from the collector 98c of the transistor 98 of the bistable multivibrator 92a to the second bistable multivibrator 92b causing its transistor 96 to become nonconducting and its transistor 98 to become conducting. This in turn transmits a positive pulse from the collector 98c of the transistor 98 of the bistable multivibrator 92b to the third bistable multivibrator 92c causing its transistor 96 to become nonconducting and its transistor 98 to become conducting.

The second positive pulse on line G of FIGURE 2 causes the first bistable multivibrator 92a to reverse again. That is, its transistor 96 becomes conducting and its transistor 98 becomes nonconducting. However, a negative pulse is transmitted to the second bistable multivibrator 92b. Since the circuits do not respond to negative pulses nothing further happens in the circuit.

The third positive pulse on line G of FIGURE 2 causes the first bistable multivibrator 92a to again reverse, its transistor 96 becoming nonconducting and its transistor 98 becoming conducting. A positive pulse is transmitted to the second bistable multivibrator 92b causing its transistor 96 to become conducting and its transistor 98 to become nonconducting. Since this action results in the generation of a negative pulse at the collector 98c of its transistor 98, no further action ensues.

The fourth positive pulse on line G of FIGURE 2 again reverses the first bistable multivibrator 92a with its transistor 96 becoming conducting and its transistor 98 becoming nonconducting.

In a manner similar to the above, the fifth pulse on line G in FIGURE 2 causes transistor 96 of bistable multivibrator 92a to become nonconducting, and transistor 98 of bistable multivibrator 92a to become conducting which transmits a positive pulse causing the transistors of bistable multivibrator 92b to change stable states. This in turn transmits a positive pulse to the transistors of bistable multivibrator 92c to change stable states.

Up to this point the proper conditions for coincidence have not been achieved. However, positive pulse number 6 on line G of FIGURE 2 sets up these conditions by reversing the first bistable multivibrator 92a.

Since the proper conditions for coincidence are now set up, no current is available for the base 112b of the transistor 112 which therefore becomes nonconducting with its collector potential falling to a negative level. This causes current to flow through resistor 118 and diode 120 to the base of the transistor 96 in the second bistable multivibrator 92b causing a state reversal. Since this destroys the conditions for coincidence, transistor 112 again becomes conducting and the waveform of its collector 112c will be a short negative impulse as shown in line L of FIGURE 2.

The states of the three bistable multivibrators 92 are now the same as they were just preceding pulse number one in line G of FIGURE 2. The next pulse in line G of FIGURE 2 will therefore cause the same cycle as previously described to repeat. The electronic counter 24 therefore has a scale of six.

The collector waveform of the transistor 98 of the bistable multivibrator 92c as shown on line K of FIGURE 2 completes one cycle of operation for each six signals produced by the gate former 20. This waveform is used to actuate relay 122 of the relay unit 26. Each time the transistor 98 of bistable multivibrator 92c becomes nonconducting, current is supplied via resistor 124 to the base of the transistor 126 causing it to become conducting allowing current to flow through the coil 122a, closing its contacts 122b. When the transistor 98 of the bistable multivibrator 92c becomes conducting, no current is supplied through the resistor 124 to the base of transistor 126 which becomes nonconducting stopping the flow of current through the coil 122a and the contacts 122b are released.

An electro-mechanical counter 28 is controlled by relay 122. Each time relay 122 is energized one count is added to the number read on the electro-mechanical counter 28.

There has thus been shown improved apparatus for indicating the amount of use in a communication system. In particular, an automatic counter has been shown which will display a number equal to the number of characters which have been transmitted or received in the communication circuit to which the counter is connected. A transistorized electronic counter has been included in the apparatus for dividing the character count into a word count.

It will now be obvious to those skilled in the art any modifications and variations of the apparatus which do not depart from the spirit of the invention.

What is claimed is:

1. In a communication system employing characters represented by combinations of marks and spaces with a start space at the beginning of each character and a stop mark at the end of each character, a counter comprising a circuit having a first condition and a second condition, means responsive to the mark-to-space transition at the beginning of each character for causing said circuit to change from said first condition to said second condition, means for returning said circuit to original said first condition before the occurrence of the mark-to-space transition at the beginning of the next character, signal means responsive to said circuit for generating a signal for each transition from said first condition to said second condition, and counting means responsive to said signal means for counting said signals.

2. In a communication system employing characters represented by combinations of marks and spaces with a start space at the beginning of each character and a stop mark at the end of each character, a counter comprising a circuit having a rest condition and an activated condition, means responsive to the mark-to-space transition at the beginning of the characters for causing said circuit to change from the rest condition to the active condition, means for returning said circuit to its rest condition before the occurrence of the mark-to-space transition at the beginning of the next character, signal means responsive to said circuit for generating a signal for each transition from said rest condition to said active condition, and counting means responsive to said signal means for counting said signals.

3. In a communication system employing characters represented by combinations of marks and spaces with a start space at the beginning of each character and a stop mark at the end of each character, a counter comprising a circuit having a rest condition and an activated condition, means responsive to the mark-to-space transition at the beginning of the characters for causing said circuit to change from one condition to the other condition, means included in said circuit for returning said circuit to its original condition before the occurrence of the mark-to-space transition at the beginning of the next character, signal means responsive to said circuit for generating a signal for each change from said one condition to said other condition, and counting means responsive to said signal means for counting said signals to establish a count number related to the number of changes of conditions.

4. In a communication system employing characters represented by combinations of marks and spaces with a start space at the beginning of each character and a stop mark at the end of each character, a counter comprising a circuit having a rest condition and an activated condition, means responsive to the mark-to-space transition at the beginning of the characters for causing said circuit to change from one condition to the other condition, means for returning said circuit to its original condition during the occurrence of the next stop mark, signal means responsive to said circuit for generating a signal for each change of condition, and counting means responsive to said signal means for counting said signals to establish a count number related to the number of changes of conditions.

5. In a communication system employing characters represented by combinations of marks and spaces with a start space at the beginning of each character and a stop mark at the end of each character, a counter comprising a circuit having a rest condition and an activated condition, means responsive to the mark-to-space transition at the beginning of the characters for causing said circuit to change from one condition to the other condition, means included in said circuit for returning said circuit to its original condition during the occurrence of the next stop mark, signal means for generating a signal for each pair of changes of condition of said circuit, and counting means responsive to said signal means for counting said signals.

6. In a communication system employing characters represented by combinations of marks and spaces with a start space at the beginning of each character and a stop mark at the end of each character, a counter comprising a circuit having a rest condition and an activated condition, means responsive to the mark-to-space transition at the beginning of the characters for causing said circuit to change from the rest condition to the activated condition, means associated with said circuit for returning said circuit to its rest condition during the occurrence of the next stop mark, signal means for generating a signal for each pair of changes of condition of said circuit, and counting means responsive to said signal means for counting said signals.

7. In a communication system employing characters represented by combinations of marks and spaces with a start space at the beginning of each character and a stop mark at the end of each character, a counter comprising a circuit having two states, means responsive to the mark-to-space transition at the beginning of the characters for causing said circuit to change from a first state to a second state, means for returning said circuit from the second state to the first state before the occurrence of the mark-to-space transition at the beginning of the next character, means for giving an indication for each change of state, and means for counting said indications.

8. In a communication system employing characters represented by combinations of marks and spaces with a start space at the beginning of each character and a stop mark at the end of each character, a counter comprising a circuit having two states, means responsive to the mark-to-space transition at the beginning of the characters for causing said circuit to change from a first state to a second state, means for returning said circuit from the second state to the first state during the occurrence of the next stop mark, means for giving an indication for each pair of changes of state, and counting means for counting said indications.

9. In a communication system employing characters represented by combinations of marks and spaces with a start space at the beginning of each character and a stop mark at the end of each character, a counter comprising a circuit having two states, means responsive to the mark-to-space transition at the beginning of the characters for causing said circuit to change from a first state to a second state, means included in said circuit for returning said circuit from the second state to the first state during occurrence of the next stop mark, means for giving an indication for each change of state of said circuit, and counting means for counting said indications to establish a count number related to the number of changes of state.

10. In a communication system employing characters represented by combinations of marks and spaces with a start space at the beginning of each character and a stop mark at the end of each character, a counter comprising a circuit having a stable and an unstable state, means responsive to the mark-to-space transition at the beginning of the characters for causing said circuit to change from a stable state to an unstable state, means connected to said circuit for returning said circuit from the unstable state to the stable state during the occurrence of the next stop character, means for giving an indication for each pair of changes of state of said circuit, and counting means for counting said indications to establish a count number related to the number of changes of states.

11. In a communication system employing characters represented by combinations of marks and spaces with a start space at the beginning of each character and a stop mark at the end of each character, a counter comprising a monostable circuit, means responsive to the mark-to-space transition at the beginning of the characters for causing said monostable circuit to change from a stable state to an unstable state, said monostable circuit returning from the unstable state to the stable state during the occurrence of the next stop mark, means for giving an indication during each transition from said stable state to said unstable state, and counting means for counting said indications.

12. In a telegraph loop communication system employing characters represented by marks and spaces with a start space at the beginning of each character and a stop mark at the end of each character, a character counter comprising a keyed oscillator for receiving the marks and spaces from a telegraph loop, a rectifier-filter responsive to said keyed oscillator to demodulate the keyed oscillations, a trigger circuit responsive to said rectifier-filter for shaping the demodulated signals, a first differentiator for differentiating the shaped signals, a gate former responsive to said first differentiator, said gate former being activated by the differentiated signal representing the mark-to-space transition at the beginning of each character and being deactivated during the next stop mark, a second differentiator for differentiating the signals from said gate former, and a counter for counting differentiated signals from said second differentiator.

13. In a telegraph loop communication system employing characters represented by marks and spaces with a start space at the beginning of each character and a stop mark at the end of each character, a character group counter comprising a keyed oscillator for receiving the marks and spaces from a telegraph loop, a direct current isolation transformer responsive to said keyed oscillator, a rectifier-filter responsive to said direct current isolation transformer to demodulate the direct current isolated keyed oscillations, a trigger circuit responsive to said rectifier-filter for shaping demodulated signals, a first differentiator for differentiating the shaped signals, a gate former responsive to said first differentiator, said gate former being activated by the differentiated signal representing the mark-to-space transition at the beginning of each character and deactivating during the next stop mark, a second differentiator for differentiating the signals from said gate former, an electronic counter for counting the differentiated signals from said second differentiator, a relay energizable whenever said electronic counter registers a predetermined count, and a mechanical counter responsive to said relay to count the energizations of said relay and display said count.

14. The telegraph loop communication system of claim 13 wherein said predetermined count of said electronic counter is six.

15. The telegraph loop communication system of claim 14 wherein said keyed oscillator, said trigger circuit, said gate former and said electronic counter each comprises transistor means.

References Cited in the file of this patent

UNITED STATES PATENTS

| | | |
|---|---|---|
| 1,979,484 | Mathes | Nov. 6, 1934 |
| 2,513,910 | Bliss | July 4, 1950 |
| 2,619,542 | Carver | Nov. 25, 1952 |
| 2,689,950 | Bayliss | Sept. 21, 1954 |
| 2,732,428 | Dain | Jan. 24, 1956 |
| 2,924,708 | Harrison | Feb. 9, 1960 |